United States Patent

Pareto

[11] Patent Number: 5,991,098
[45] Date of Patent: Nov. 23, 1999

[54] LENS STRUCTURE WITHOUT SPHERICAL ABERRATION AND STEREOSCOPIC CAMERA INCLUDING SUCH LENS STRUCTURE

[76] Inventor: Eugeni Jordana Pareto, Calle Eusebio Guell No. 81, Sant Boide Llobregat, Barcelona, Spain

[21] Appl. No.: 08/860,987
[22] PCT Filed: Dec. 12, 1995
[86] PCT No.: PCT/EP95/04903
§ 371 Date: Jul. 10, 1998
§ 102(e) Date: Jul. 10, 1998
[87] PCT Pub. No.: WO97/22020
PCT Pub. Date: Jun. 19, 1997
[51] Int. Cl.$^6$ .............................. G02B 3/02; G02B 27/10
[52] U.S. Cl. ......................... 359/718; 359/708; 359/619
[58] Field of Search .................................. 359/462, 463, 359/642, 708, 712, 718, 725, 900, 619

[56] References Cited

U.S. PATENT DOCUMENTS 1,507,212   9/1924   Silberstein .............................. 359/718

OTHER PUBLICATIONS

Hecht, Optics—2nd edition, Addison–Wesley Publishing (pp. 129–133, 225–226), 1987.
Born & Wolfe, Principles of Optics—4th edition, Pergomon Press (pp. 166–169, 197–202), 1970.
Martin, Technical Optics, vol. 2, Sir Isaac Pitman & Sons, Ltd. (pp. 303–307), 1950.

*Primary Examiner*—Georgia Epps
*Assistant Examiner*—David N. Spector
*Attorney, Agent, or Firm*—Mathews, Collins, Sherperd & Gould, P.A.

[57] ABSTRACT

A lens structure without spherical aberration, formed by a first (S) and second (S') curved surface of transparent material facing one towards the other, wherein the first surface (S) has a configuration chosen between a first and second sub-configuration, the first sub-configuration being obtained by applying the sine of the limit refraction angle (i') of the transparent material, the derived value being the focus location of the first configuration on a horizontal axis (XX'), and the second sub-configuration being obtained by applying the sine of the limit refraction angle (i') of the transparent material, the derived value being the focus location of the first configuration on a horizontal axis (XX'), and the second sub-configuration being obtained by applying the sine of the limit refraction angle (I') of the transparent material for vertex (v) positioning of the second configuration on the horizontal axis (XX'). If a particular lens focus (F) is desired, the second curved surface (S') can be built according to a formula which optically correlates the second one (f") of the second surface focuses (f'; f") with the desired lens focus (F), the first one (f') of said second surface focuses (f'; f") being always in coincidence with one focus (f) of the first curved surface (S). It is also disclosed a stereoscopic camera including such a lens structure.

10 Claims, 9 Drawing Sheets

ND STEREOSCOPIC
LENS STRUCTURE WITHOUT SPHERICAL ABERRATION AND STEREOSCOPIC CAMERA INCLUDING SUCH LENS STRUCTURE

FIELD OF THE INVENTION

The present invention relates to a lens structure without spherical aberration for various purposes, and also to a stereoscopic camera including such lens structure.

BACKGROUND OF THE INVENTION

It is well known that if a beam formed by any set of parallel rays of light, of any spectral colour wave, are directed onto a spherical convex surface of any transparent material, the light reflected therethrough will not provide an exact or punctual perfect focus, because of the spherical aberration phenomenon.

In a similar manner, but inversely, from inside any transparent material of convex spherical shape, any possible parallel beam of light will not be focused in punctual perfect focus because of the same spherical aberration phenomenon.

The same results are obtained if, instead of convex spherical surfaces, concave spherical surfaces are used as, in this case, the same aberration will be produced for the elongation of rays, i.e. the virtual focus will not be a punctual focus.

When spherical refraction surfaces are used, it is known that the normal to all refraction points of the spherical curvature is the radius directed to the centre of the sphere. In spite of this, this will not give us a punctual focus, since it is necessary that the curvature should not be so uniformly continuously curved but, on the contrary, that the same has a constant change, from the horizontal axis to the end of the curve.

Also, for the contrary refraction phenomenon, be it from inside the transparent material to the air, the spherical curvature makes the refraction through the extreme sides of the same impossible, or be it from convex surfaces ends, the light will not be refracted because the rays would go out from the curved surface, with an angle greater than the limit refraction angle of the transparent material, thus being reflected instead of refracted. Also for the rays going out from the surface, within the limit refraction angle, the refraction will not be the same for all the parallel rays, and the rays with angles nearer to the axis will be refracted less than the more separate rays and for this reason the refracted rays will cross the axis at different points, the farther away the rays the neater to the central axis of the spherical convex surface they are arranged.

The above cited difficulties will be resolved by employing the lenses without spherical aberration for the two kinds of light refraction and for convex or concave surfaces.

As to a stereoscopic camera, it is commonly known stereoscopic photography without using any lenses, that is made by a vertical lenticular photographic film, from different objectives placed side by side in order to obtain distinct intercalated images to produce a wide viewing zone of stereoscopic photography.

In spite of this, by employing multiple objectives it is not possible to obtain a perfect change in the stereoscopic vision when the viewer laterally translates his head, producing changes in the vision of the distinct adjacent sides of the distinct images of the multiple objectives. For this reason, it is not known a stereoscopic photography with the high quality standards needed by modern audiovisual techniques.

SUMMARY OF THE INVENTION

A basic aspect of this invention resides in showing that there are two geometrical perfect surfaces for those two kinds of light optical refraction, i.e. from the air through any optical surface, and inversely from inside any transparent material to the air, and also in connection with the shape of the surface, either convex or concave.

A principal aim of the present invention is to build lenses, both concave and convex, without spherical aberration.

Within this aim, an object of the present invention is to derive a mathematical formula useful to build lenses without spherical aberration.

A further object of the present invention is to build a stereoscopic camera, for viewing the stereoscopic effect without the need of lenses in front of it, which employs lenses without spherical aberration used both for the wide angle objective and the lenticular vertical optical film employed by said camera.

A still further object of this invention is to obtain stereoscopic pictures only in a horizontal direction.

These and other objects, features and advantages can be accomplished by a lens structure without spherical aberration, formed by a first and second curved surface of transparent material facing one towards the other, characterized in that said first surface has a configuration chosen between a first and second sub-configuration, said first sub-configuration being obtained by applying the sine of the limit refraction angle of said transparent material, the derived value being the focus location of said first configuration on a horizontal axis, and said second subconfiguration being obtained by applying the sine of said limit refraction angle of said transparent material for vertex positioning of said second configuration on said horizontal axis.

It is necessary to point out that for the first type of light refraction, (from the air through any transparent material) for the convex surface, it has been obtained that the transparent material must be ellipsoidally curved and, for concave surface, the curvature of the material must be of hyperboloidal shape.

For the opposite phenomenon of refraction, from inside the transparent material to the air, the correct refraction surface will be of hyperboloidal curvature for convex shape and ellipsoidal curvature for concave shape.

As will be shown in greater details in the following description and attached drawings of this application, the manner to obtain those two curvatures, both ellipsoidal and hyperboloidal, with convex or concave shape is related to the refraction index of the material used for the construction of the lenses, and also to the refraction limit angle thereof. The value of this limit refraction angle will be applied as a proportional factor for focus location for the ellipsoidal curvature and for location of the curve vertex in case of hyperboloidal curvature.

It is possible to see that, for ellipsoidal curvatures, the ellipse used to obtain such a curvature will be inscribed within a circumference, the location of the ellipse focus being obtained by the application of the sine of the limit refraction angle of the transparent material being employed, as a proportional factor for focus ellipse location, within the horizontal axis, that is also the circumference diameter whereinto the ellipse is inscribed.

To obtain hyperboloidal curvatures, the hyperbole will be inscribed within the applied angle and this is achieved by means of the sine factor, to proportionally locate the vertex of the hyperbole within the angle where said hyperbole is inscribed.

In summary, it is to be said that to obtain ellipsoidal surfaces, the main factor is the focus location with reference to the limit refraction angle of the employed material, and for hyperboloidal surfaces the limit refraction angle will be used for the curve vertex location.

It is also to be said that in both basic curvatures, the punctual focus of the refracted light is in coincidence with the second focus. This applies both to ellipsoidal and hyperboloidal surfaces (curvatures).

Furthermore, it should be mentioned that, for ease, the transparent material employed is supposed to be standard glass, with a limit refraction angle of 41°49', the exact sine thereof being 0.666 or, put in another form, ⅔.

Finally, the construction of lenses for different focus distances will be carried out for one side, by means of the basic ellipsoidal or hyperboloidal convex or concave surfaces and the other variable side will be made by means of a new ellipsoidal or hyperboloidal surface, with one focus always in coincidence with one basic focus, and the other focus in optical relation with the focus distance required for the lens.

As to the stereoscopic camera, the stereoscopic pictures will be perfectly observed with stereoscopic effect, while the viewer maintains his head within the viewing zone which is as wide as the width of the objective built according to the present invention, employing lenses without spherical aberration.

As is commonly known, the stereoscopic film will appear in the film camera with its stereoscopic effect reversed. The near objects will appear inside the film and the background objects will appear in front of the film. It is thus necessary to reverse this stereoscopic effect to obtain a copy which provides the correct stereoscopic vision.

BRIEF DESCRIPTION OF THE DRAWINGS

The invention will become more readily apparent from the following description of preferred embodiments thereof shown, by way of examples only, in the accompanying drawings, in which:

FIG. 7b shows, at the left side, the same basic concave hyperboloidal surface and, at the right side, a plane surface, i.e. a hyperboloidal surface with the two focuses thereof of the same value, as seen in FIG. 4a.

DETAILED DESCRIPTION OF THE PREFERRED EMBODIMENTS

Figure 1A:
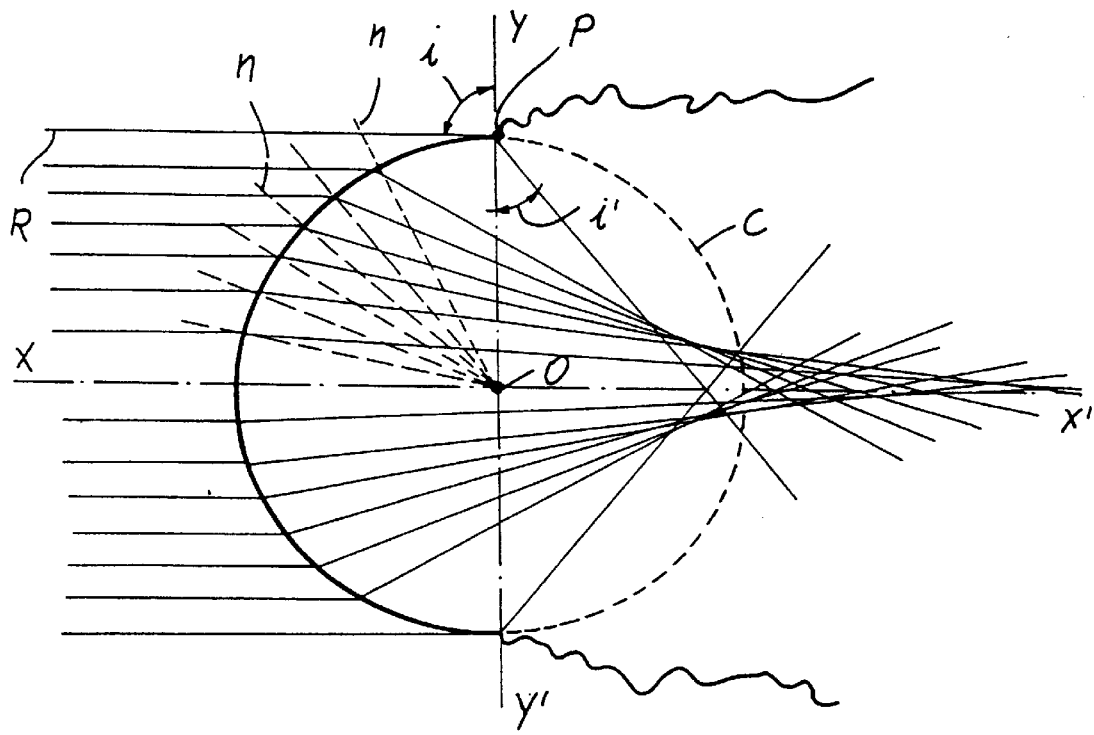
FIG. 1a is a schematic elevation view showing the effect of any spherical refraction surface of convex shape, for any horizontal beam of parallel rays of light, putting in evidence the occurrence of the spherical aberration phenomenon.

The present invention will be described in detail by means of the attached drawings. In FIG. 1a it is shown, in schematic elevational view, a beam of horizontal rays of light (R), which are supposed to come from any colour wave of the spectrum and are refracted through a spherical convex surface of some transparent material, with spherical shape as shown by the circumference C. The centre of the circumference C is located at the point O.

For each horizontal ray there is the normal n, at each refraction point, that is the radius to the centre.

The uppermost and lowermost rays of light, at the point P both make with the vertical axis YY' the maximum incident angle i of 90° and will be refracted following the limit refraction angle i', crossing the central horizontal axis XX' at one point near to the centre O.

For the other horizontal rays of light, the refraction will not be as near to the centre of the sphere, according to the refraction law, whereby each ray will provide a refraction line more distant from the centre, the refracted rays thus crossing the horizontal axis XX' at a more distant point.

This is intended only to be an explanation of the known spherical aberration phenomenon.

Figure 1B:
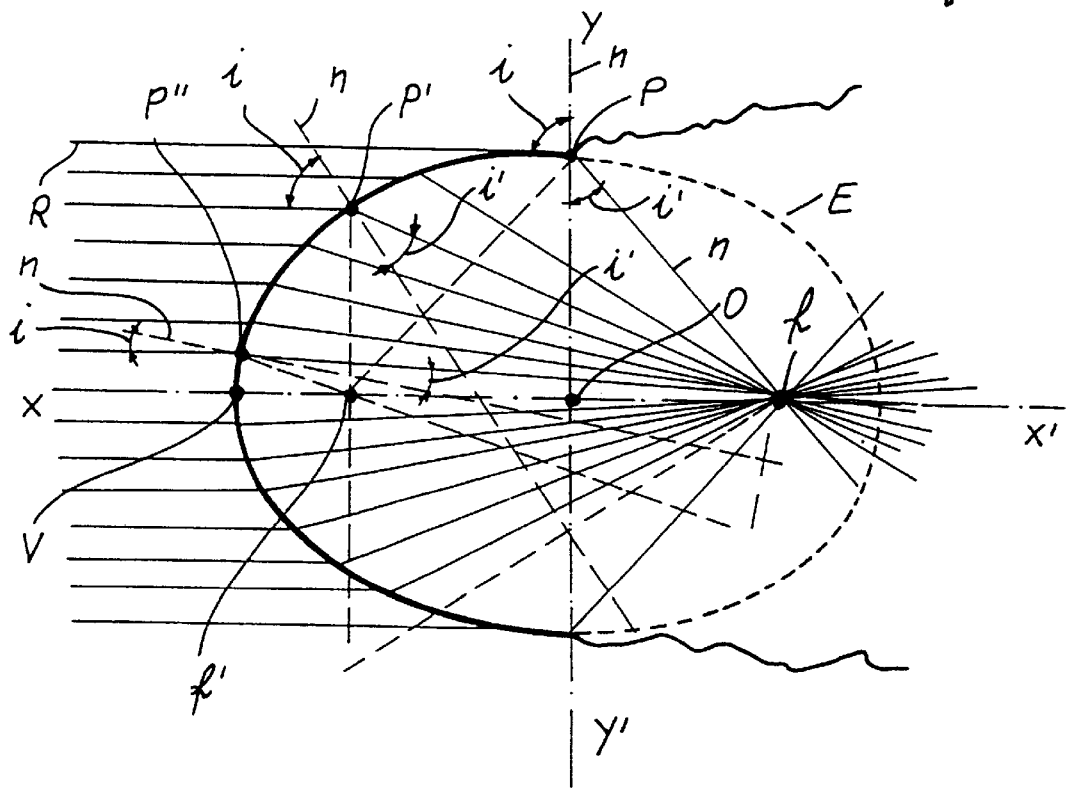
FIG. 1b shows how an ellipsoidal surface of convex shape provides the punctual focus of the rays, at the second ellipsoidal focus, without any spherical aberration, according to the present invention.

In FIG. 1b it is shown how the ellipsoidal surface formed by the ellipse E will provide a punctual focus.

The uppermost horizontal ray of the beam of rays R arrives at the ellipsoidal surface at the point P, making the maximum incident angle i of 90°, with the vertical ellipsoidal axis YY'; the refracted ray i' then crosses the horizontal axis XX', of the ellipsoid at the point f which is exactly the location of one ellipsoidal focus of that ellipsoidal surface. The other ellipsoidal focus will be placed at f', at the same distance from the vertical axis YY' as the focus f, but at the left side of the ellipsoid. Then, by these two focuses f and f', it is possible to trace the ellipsoid.

For all the refraction points P, P' and P", drawn by means of example, the normal n is the bisector of the angle formed between the two radii of the ellipse, whereby it always occurs that the angle of incidence i, the normal n and the angle of refraction will always be in relation according to the proportional $2/3$ sine refraction law, from the point which is in coincidence with the vertical axis YY' to zero angle for the point in coincidence with the horizontal axis XX'.

Thus, it is obtained that all the horizontal rays of light R will converge in the right ellipsoidal focus f.

Figure 2A:
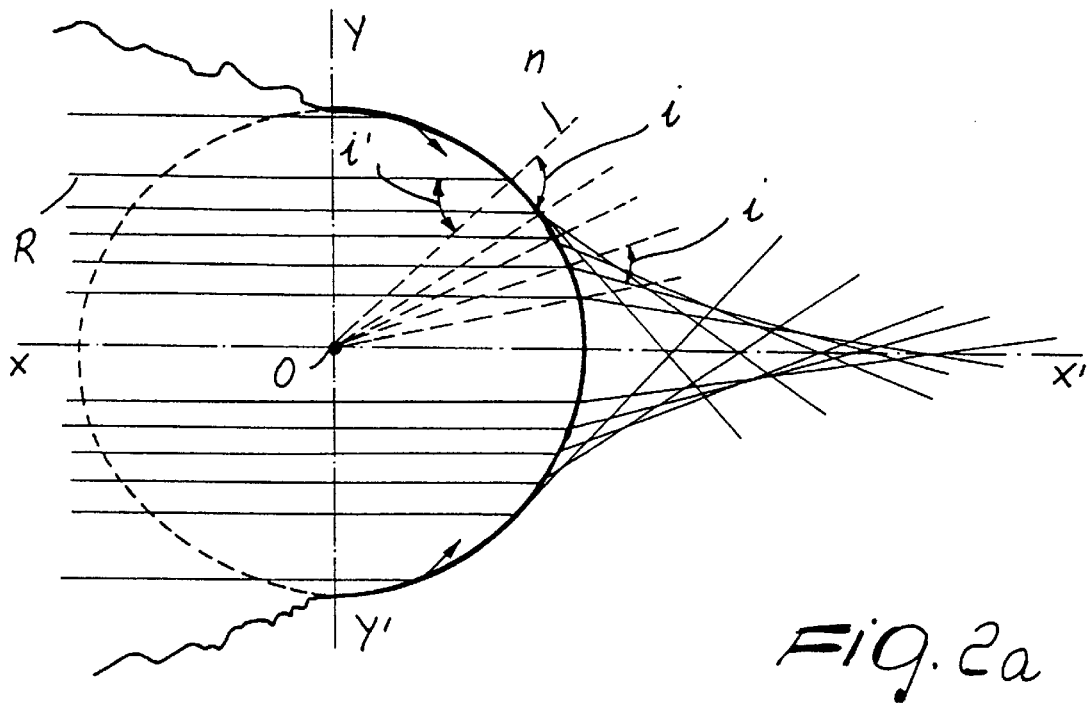
FIG. 2a is a schematic elevation view showing how a convex spherical refraction surface provides, for a horizontal beam of light going from inside the material towards the air, that the extreme rays are reflected instead of refracted, and the refracted rays will be subjected to the same spherical aberration, thus not providing a punctual focus.

In FIG. 2a, also in schematic plan view, it is shown the behaviour of a convex spherical surface and it is also supposed that the light is going out from inside the transparent material. It is seen that the uppermost and the lowermost light rays of the beam R will not be refracted because they will go out from the spherical surface, outside the limit refraction angle i', whereby it is not possible to employ all the light refraction of the beam.

All the distinct light rays of the beam R will go out from the transparent material, by distinct refraction angles, firstly from the maximum refraction angle of 90°, whereby the crossing point of this refracted rays will be at a point nearer to the spherical surface, the other rays which are nearer to the centre of the sphere being not as refracted because of the spherical aberration phenomenon. Accordingly, these refracted rays will cross the horizontal axis at points, the farther they are from the centre O of the sphere, the nearer they are to this centre before being refracted.

In FIG. 2a, in spite of the normal lines, i.e. the radii are all coincident with the centre of the sphere, the refracted rays will not be coincident to produce the required punctual focus on the axis XX'.

Figure 2B:
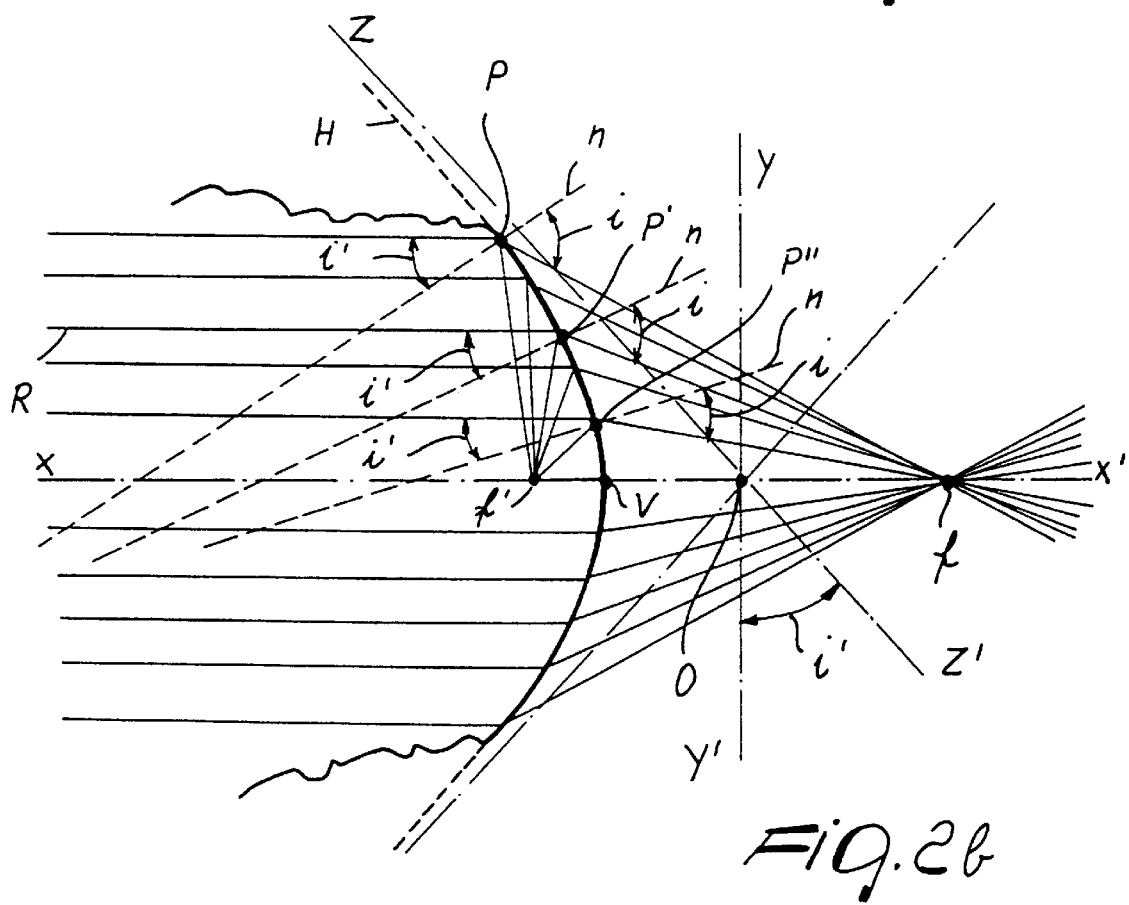
FIG. 2b shows that the hyperboloidal surface will cause all the rays of light to converge at the second hyperboloidal focus, thus producing a punctual focus, without spherical aberration phenomenon, according to the present invention.

FIG. 2b shows the convex hyperboloidal surface which resolves the punctual focus for the refracted rays going out from inside any transparent material.

The horizontal and vertical axes of the hyperbole H that will be used to obtain the hyperboloidal surface are the lines XX' and YY' and the two focus points are the points f' and f, and the crossing point O is the vertex of the angle within which the hyperbole is inscribed.

The inclined axis ZZ', exactly follows the limit refraction angle i' of the transparent material employed for that surface, and in this FIG. 2b it is supposed that this material is glass, whereby the limit refraction angle i' will be 41°49'. This angle limits the hyperbole to infinite.

To obtain this hyperbole inscribed within the above said angle i', it will be used the vertex positioning, at the exact location, which will be in optical relation with the sine of the limit refraction angle i'.

Since the limit angle is 41°49', its sine will be 0.666 or $2/3$ whereby the vertex of the hyperbole will be placed at $2/3$ of the (f', 0) distance. Next, the hyperbole will be traced.

It is also noted that all the rays of light R, going out from inside the transparent material and parallel with the horizontal axis XX', when refracted by the hyperboloidal surface will be focused at the point f, which is the right hyperboloidal focus. This occurs because for all the points, for example P, P' and P", the tangent to the curve passes through all the three points, the bisector between the two radii of the hyperbole, from f' and f, and because the relation between the sine of the anglers i and i', for all those points, is always in constant $2/3$ relation, according to the refraction law, from maximum refraction angle to the end of the curve, to zero angle for vertex point v.

Figure 3A:
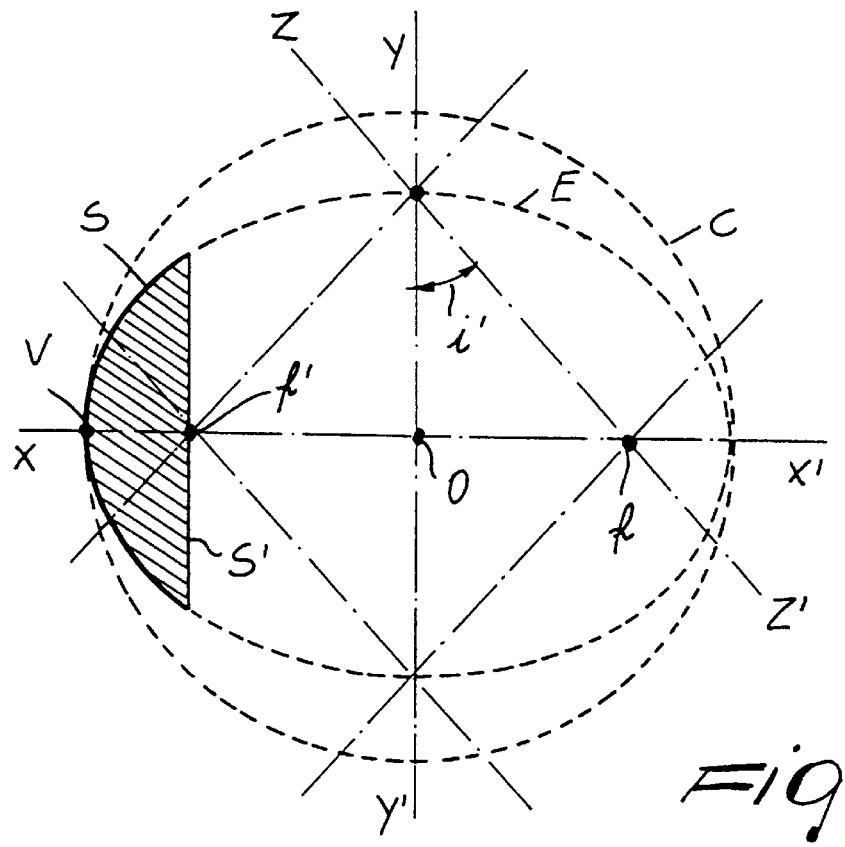
FIG. 3a is a schematic elevation view showing the attainment of the basic ellipsoidal convex surface, for one side of the lens, and the variable side of the lens for construction of said lens, with the required new surface, in optical relation with the required focus distance of the lens itself, according to the present invention.
Figure 3B:
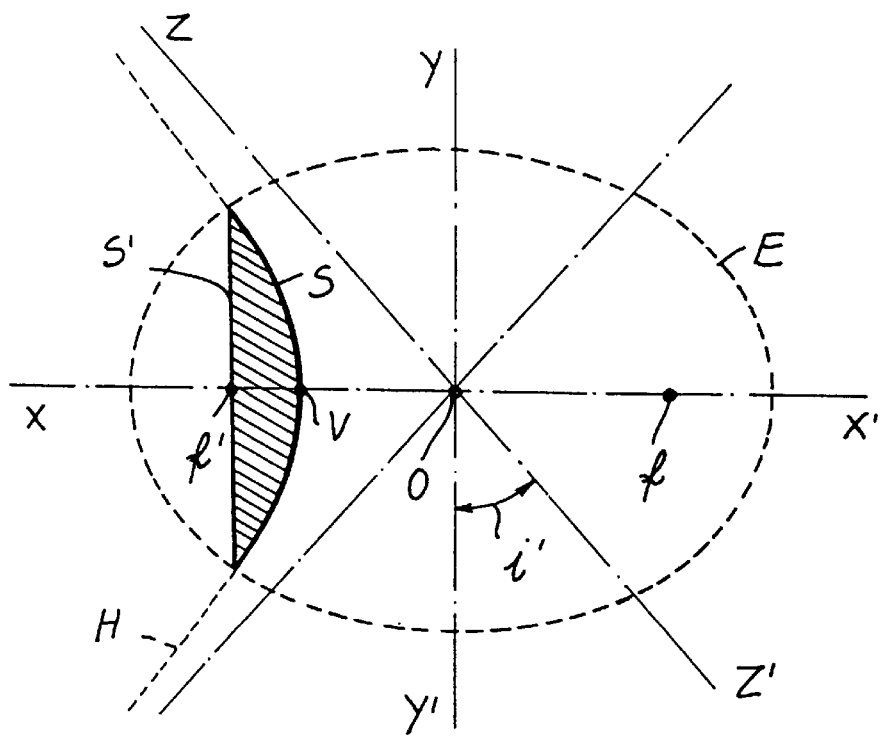
FIG. 3b is a schematic elevation view showing the basic convex hyperboloidal surface for one side of the lens, and the other variable side in optical relation with the required focus distance of the lens itself, according to the present invention.

FIG. 3 shows the basic convex lenses and in particular the basic ellipsoidal surface S is shown in FIG. 3a, and the basic hyperboloidal surface S is shown in FIG. 3b.

For all the basic convex surfaces, the two focuses f' and f are in coincidence, that is the interfocus distance (f' f) is the same in both surfaces.

In FIG. 3a we can see the basic ellipsoidal surface S at the left side and, at the right side of the lens, the variable surface S' that will provide the required focus distance for the lens, in relation with the new focus applied for this variable side of the lens.

Having employed the lens surface shown in FIG. 1b, we see that the ellipse E is inscribed within the circumference C, the line XX' being the horizontal axis of the ellipse and the line YY' being the vertical axis thereof.

Furthermore, it can be seen the inclined axis ZZ', with angle i' in relation with the limit refraction angle of the material employed for the lens construction; this material being supposed to be, for example, normal glass, the angle results 41°49' and its sine will be 0.666, that is $2/3$.

The value $2/3$ is exactly the inter-focus distance (f' f) of the ellipse E.

FIG. 3b shows the other basic convex lens, the surfaces S and S' having changed their positions. In this example the basic hyperboloidal convex surface S is at the right side of the lens and, on the contrary, the variable lens side S' is at the left side thereof. The surface S is the same as the one explained in FIG. 2b.

We can see the horizontal axis of the hyperbole H, that is the line XX', the vertical axis YY' and the inclined axis ZZ', which forms the limit refraction angle i' with the vertical axis YY', this angle i' being also 41°49' with its sine equal to 0.666, i.e. $2/3$.

At the variable lens side, at the left of the lens, different surfaces in optical relation with the required focus to obtain the lens will be applied and this will be shown later in greater detail.

Figure 4A:
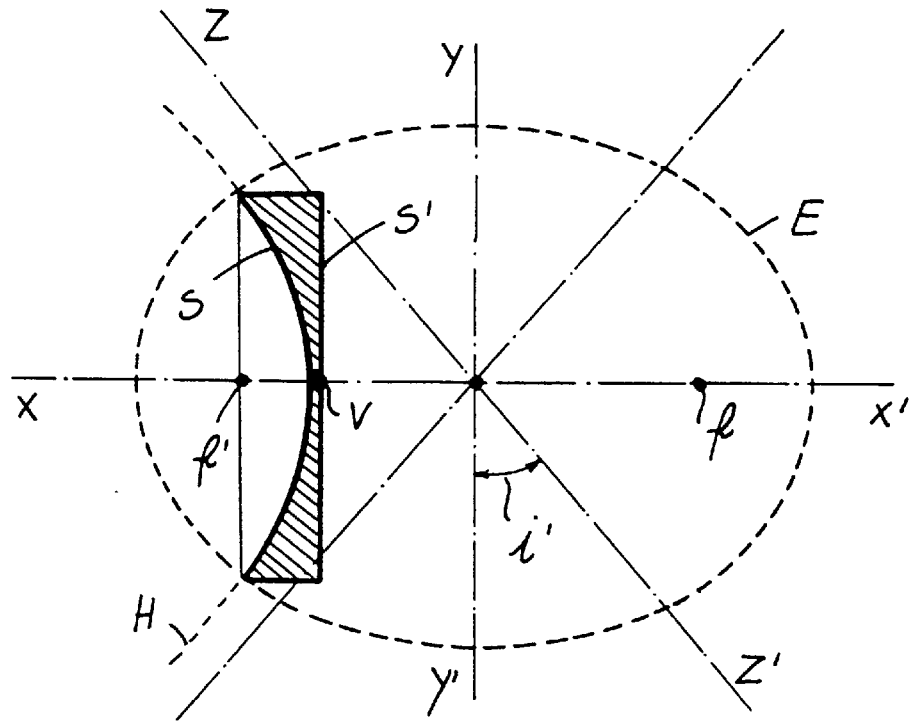
FIG. 4a is a schematic elevation view showing the basic hyperboloidal concave surface, for one side of the lens, and the other variable side for the other surface attainment, in optical relation with the required virtual lens focus distance, according to the present invention.
Figure 4B:
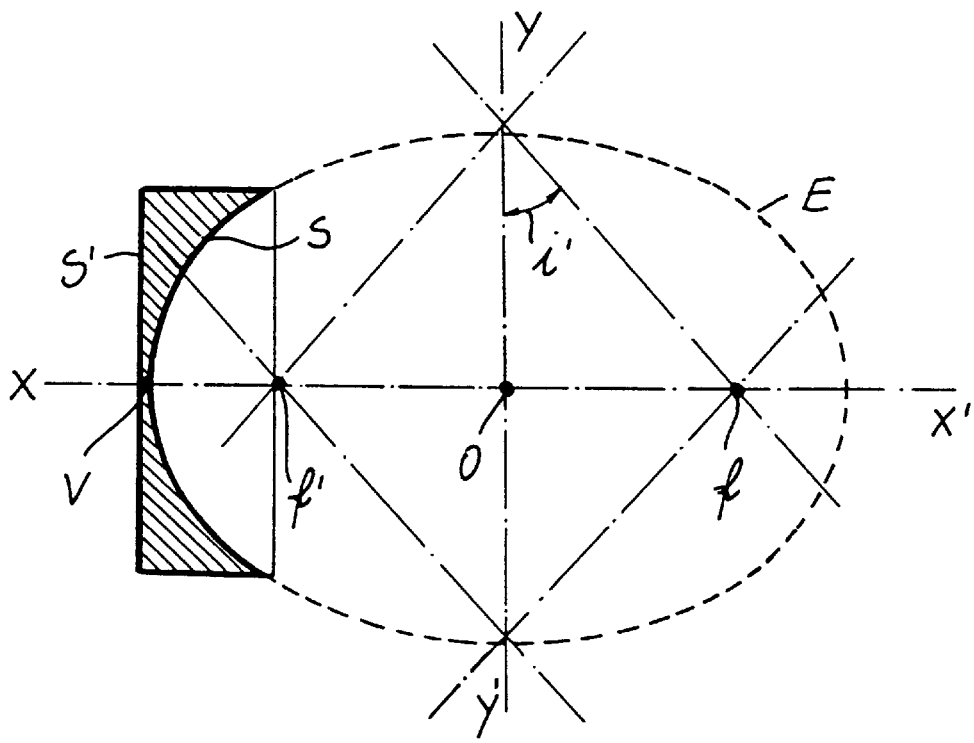
FIG. 4b is a schematic elevation view as FIG. 4a but in the case of the concave ellipsoidal side for the basic lens side, and also for the other variable lens side for the required virtual lens focus attainment, according to the present invention.

In FIG. 4a and 4b there are the same basic lenses shown in FIG. 3, but these figures are now for concave lenses.

In FIG. 4a there is the basic hyperboloidal concave surface S, at the left side of the lens, and the variable lens surface S' at the right side which will be calculated also in optical relation with the required virtual focus for the lens.

At this basic lens side, we have applied FIG. 2(a) whereby it is still possible to see three hyperboloidal axes XX', YY' and ZZ'. In the same way, we can see that the hyperboloidal surface S has been obtained by the hyperbole H which will be traced from the vertex point v, correlated with the sine of the limit refraction angle i', as a proportional value to locate the vertex v of this hyperbole within the angle where said hyperbole is inscribed. Then, we will have the two hyperboloidal focuses f', and f.

In FIG. 4(b) there is the concave basic lens, the fixed side thereof, S, being of ellipsoidal shape, the other lens side, S', being variable to obtain the virtual focus at the required distance.

The inter-focus distance (f' f) in FIG. 4(b) is the same as in FIG. 4(a), that is the two focuses are at the same positions.

The concave ellipsoidal surface S is obtained by means of the ellipse E, which is traced following the explanations given with regard to FIG. 1(b) and we see the two ellipsoidal focuses f' and f, provided by means of the limit refraction angle i' which is used to locate the ellipse focus, as it has been shown above.

As already said, the variable lens side S' will be calculated in optical relation with the required virtual lens focus.

Having explained in FIGS. 3 and 4 convex and concave lenses, now we will explain some different examples obtained by using these lenses to derive different lenses with their focuses at the correct distance; all these lenses will be without spherical aberration.

It is useful to notice that for all the new variable surfaces, both of ellipsoidal and hyperboloidal shape, one of the new radii is always in coincidence with the right basic focus f and the other new radius is in coincidence with focus positioning, in optical relation with the required lens focus F, to derive a lens without spherical aberration.

Firstly, in FIG. 5 we have two examples built on the basis of the basic lens shown in FIG. 3(a).

Figure 5A:
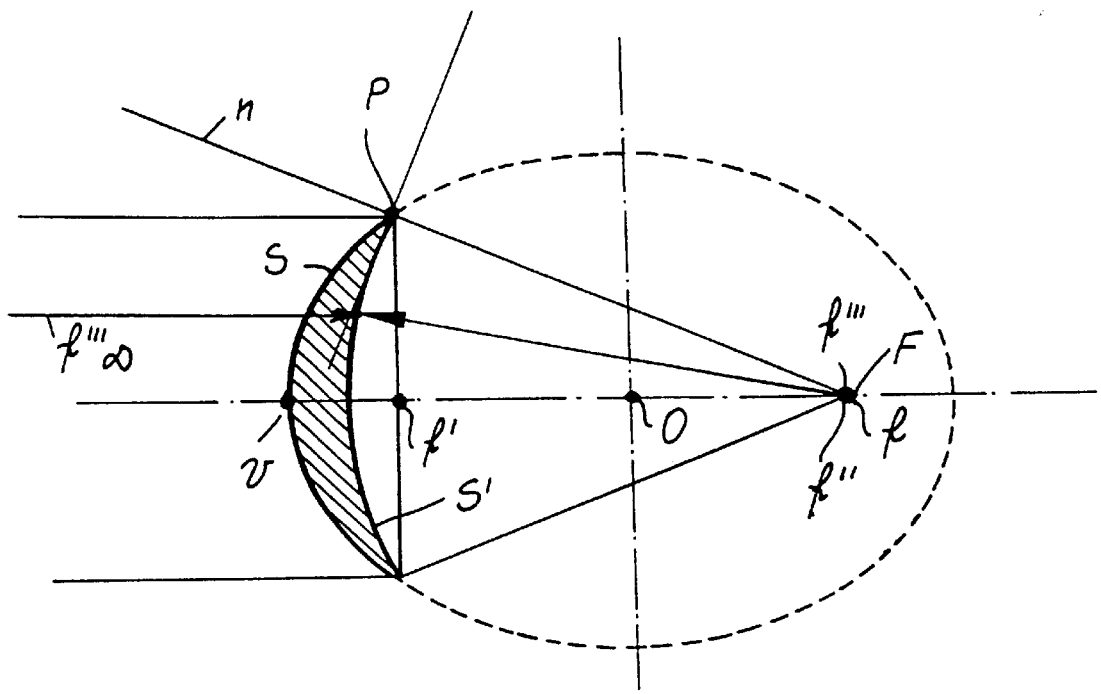
FIG. 5a is a schematic plan view showing an application to a lens, where the left side is a basic ellipsoidal surface and the right side is a spherical surface, with focus in coincidence with the right ellipsoidal focus distance, according to the present invention.

In FIG. 5(a), at the left side of the lens there is the ellipsoidal basic surface S, and all the parallel rays of light R will be refracted following a convergent direction towards the right ellipsoidal focus f. This would be achieved if the light, at the right side of the ellipsoidal surface S, were wholly inside the transparent material, as it is shown in FIG. 1(b). In this FIG. 5(a), at the right variable side of the lens, another surface S' has been applied, which in this case is of spherical shape with the centre thereof exactly in coincidence with the right ellipsoidal focus f. This new lens surface S' of spherical shape would be also traced by means of a hyperboloidal surface, having the right focus f' in coincidence with the right ellipsoidal focus f and the left hyperboloidal focus f" at the left infinite end, whereby the surface S' is of spherical shape, that is an ellipse with the two focuses f' and f" coincident at the basic ellipsoidal focus f.

Having obtained this kind of lens, it is possible to see that all the rays of light R, which will be refracted through the left basic surface S and will be directed to the right basic focus f, will cross the right surface of the lens S' without any further kind of refraction, because the centre of the sphere f' is in coincidence with the right ellipsoidal focus f and, in the same way, will be in coincidence with the lens focus F. This spherical surface S' has been traced beginning from the point P in the vertical plane of the basic ellipsoidal point f'.

By means of this lens, all of the rays of light from the beam R will be refracted and focused at the lens punctual focus point F.

Figure 5B:
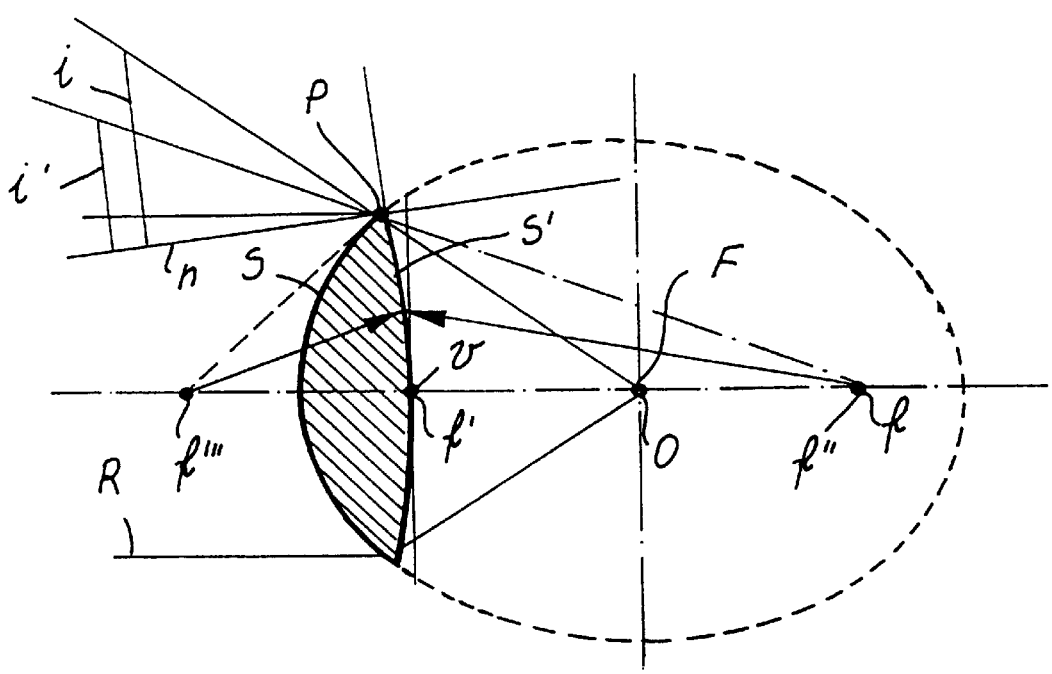
FIG. 5b shows another example, for a lens, in which at its left side there is the basic ellipsoidal surface, with new focus for short lens focus attainment, by means of the right side of the hyperboloidal convex surface, according to the present invention.

In the second example of FIG. 5(b), starting from the basic lens of FIG. 3(a), at the left side of the lens we have the same basic ellipsoidal surface S and further all of the rays of light R will be refracted and directed to the right ellipsoidal focus point f.

In this example, at the right side of the lens we traced a surface S', of hyperboloidal shape, by means of two hyperboloidal focuses f' e f", in optical relation with the required focus distance of the lens focus F.

By means of this new lens, all of the rays of light, which are refracted and directed, by the left ellipsoidal basic surface S, to the right ellipsoidal basic focus point f, by means of the new surface S' will be newly refracted and will converge at the lens focus point F, at the nearest lens point, that is the axis crossing point O.

In this new lens surface S', the right hyperboloidal focus f', as above mentioned, will always be in coincidence with the right basic ellipsoidal focus f.

As to the left focus f" it is achieved from the top lens point P, where the projections from the lens focus F and from the right hyperboloidal focus f', will enable to derive the normal n, the refraction angles i and i', having been applied, proportionally with the refraction index ⅔ of the employed material. Having thus derived the normal n, we are now able to obtain the new hyperboloidal focus f" by means of this normal n and the vertical bisector line of the same point P, as shown in the drawing. Afterwards, the new hyperboloidal surface S' can be traced, beginning from the basic left focus point f' or vertex point v.

Having obtained this new surface S', we can see that all of the rays of light R which, after refraction through the left ellipsoidal surface S would be directed to the right ellipsoidal focus f, will be newly refracted and directed to the lens focus F, at the axis crossing point O, in perfect punctual coincidence, without any spherical aberration.

After the drawing explanations, a mathematical formula to derive the variable focus for the lens variable side construction will be exposed and the coincidence between the drawings to trace the surfaces and the mathematical calculations will be put in evidence.

Figure 6A:
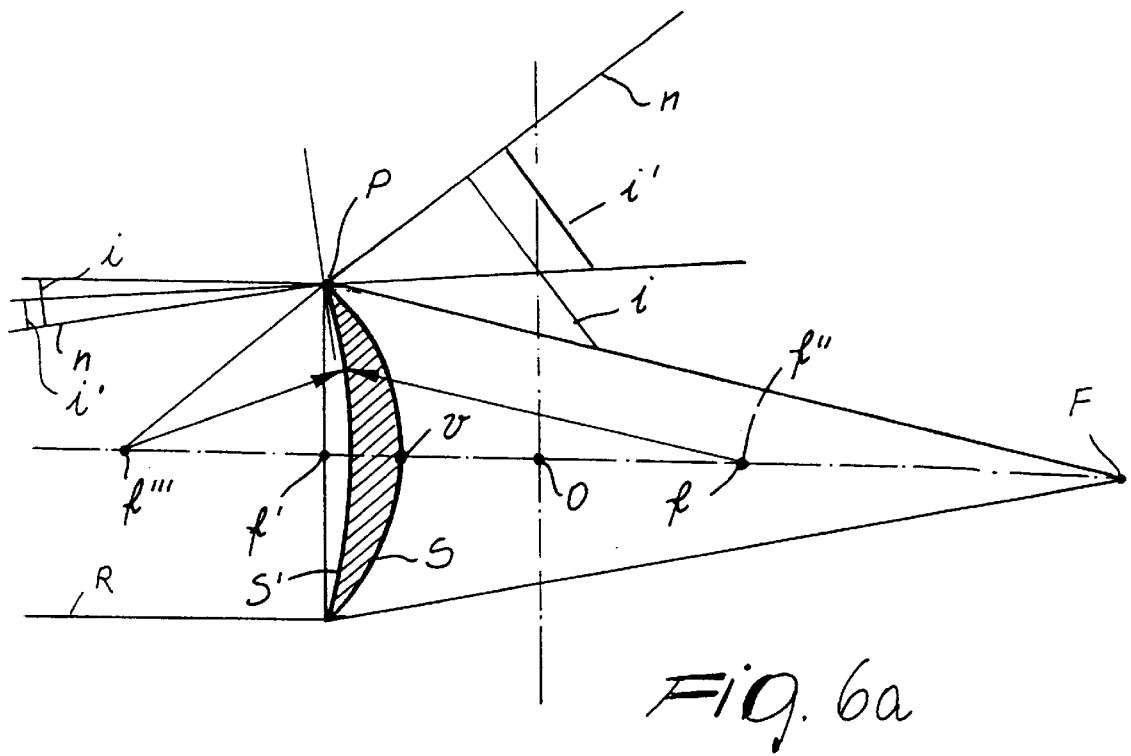
FIG. 6a is an exemplary view in which at the right side of the lens there is the basic hyperboloidal convex surface and, at the left side, not so curved a hyperboloidal surface has been applied too, with the new focus in optical relation with the required lens focus, according to the present invention.

In FIG. 6 we have two examples which have, as a basis, the basic lens of FIG. 3(b). In FIG. 6(a) the hyperboloidal convex shape for the right lens surface S of the basic lens of FIG. 3(b) has been used.

As to the left surface S' of the lens, not such a hyperboloidal surface has been used, by placing the new hyperboloidal focuses f" and f' in optical relation with the lens focus F. The right new focus f', as above mentioned, is always in coincidence with the right hyperboloidal basic focus f, and the left new focus f" is at the half of the inter-focus distance, at the left side of the left hyperboloidal curved surface S'.

In this figure, at point P, we have traced, for the two lens sides S and S', the two normal lines n. By means of these normal lines n and having used the proportional angles i and i' following the refraction index value of ⅔, we derive that the bisector of the angle, from P, for the left surface S', will have the focus f' at the right side thereof and the focus f" at the left side thereof.

Figure 6B:
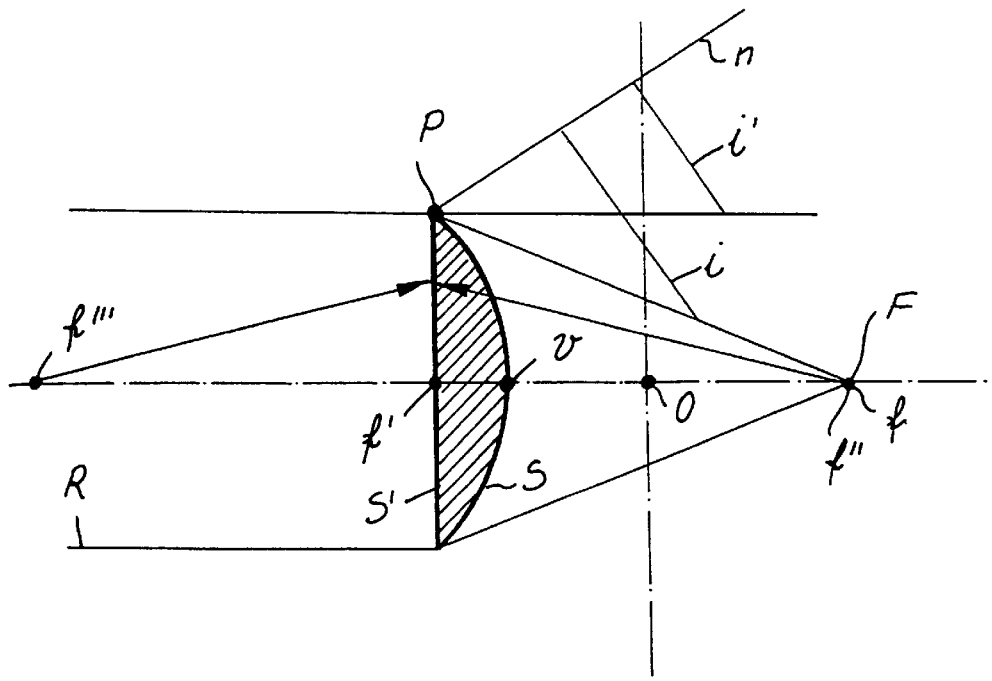
FIG. 6b shows a plane hyperboloidal convex lens, that is the basic lens shown in FIG. 3b, where at the right side there is the basic hyperboloidal surface and, at the left side, there is a hyperboloidal surface with the two focuses of the same value, i.e. a plane surface, according to the present invention.

In the second example, in FIG. 6(b), we have again the basic lens, at the right side with the surface S, obtained by the two hyperboloidal focuses f' and f.

In this example, at the right side, that is at the basic hyperboloidal surface as in FIG. 3(b), we have the hyperboloidal basic surface S, derived from the two hyperboloidal basic focuses f' and f. At the left side, a hyperboloidal surface with the two focuses at the same distance has been applied, whereby the derived surface S' is a plane one and all of the parallel rays of light will go out of this surface without any change in the light direction, that is without any refraction.

At the other side of the lens, that is the surface S, at the point P, we see the normal n, and the two incident and refracted rays of light respectively at angles i and i' of $\frac{2}{3}$ within this normal and we can see that the refracted ray is focused at the right basic focus point f, where there is the lens focus point F.

Figure 7A:
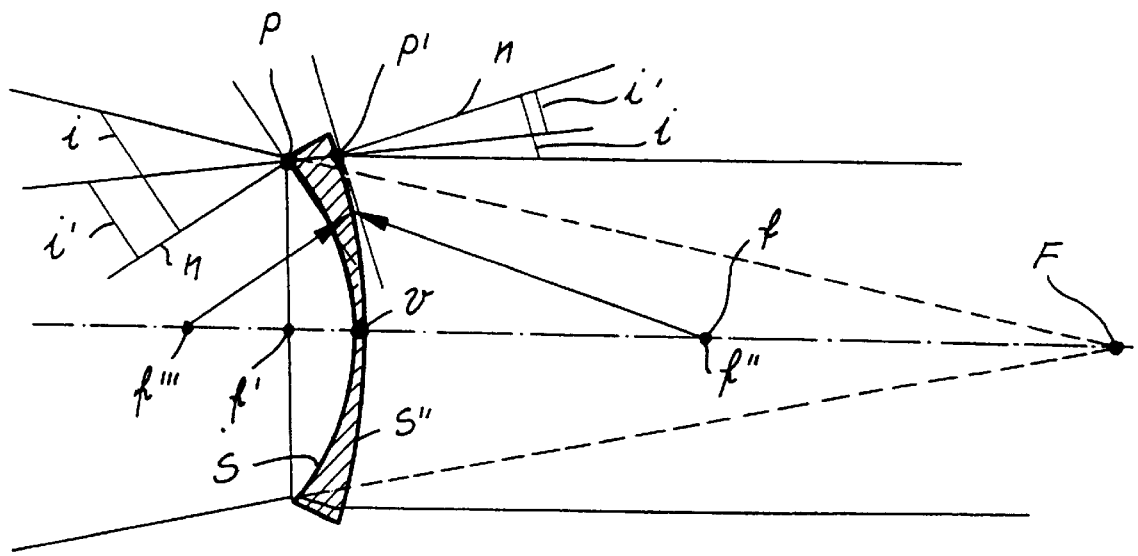
FIG. 7a shows, at the left side, the concave hyperboloidal surface of basic shape, and, at the right side of the lens, another not so curved hyperboloidal surface, by means of which, the virtual focus of the concave lens will be obtained at the required distance, according to the present invention.

In FIG. 7(a), we have the left hyperboloidal concave basic surface S, obtained from the two hyperboloidal focuses f' and f.

The right hyperboloidal surface S' is not a plane surface as the basic lens, but in this example we have used a new hypetboloidal surface by means of a new hyperboloidal focus f'' placed at the left of the focus f' with a value equal to half of the distance (v f).

In FIG. 7(a) we see that the projections from the virtual focus F, when they pass through point P, for the first lens surface S, and also the normal n, with the angles i and i' proportional to the refraction by the value $\frac{2}{3}$, will provide that the refracted rays of light will go out through the lens thickness, in a divergent direction rather than in a convergent one. After this, from the other point P' for the surface S' and the other normal n and angles i and i' also at $\frac{2}{3}$ within it, the ray of refracted light is directed parallely towards infinite as any divergent lens does.

The virtual focus F is more towards the right of the focus f, at the required distance for the convergent rays R.

Figure 7B:
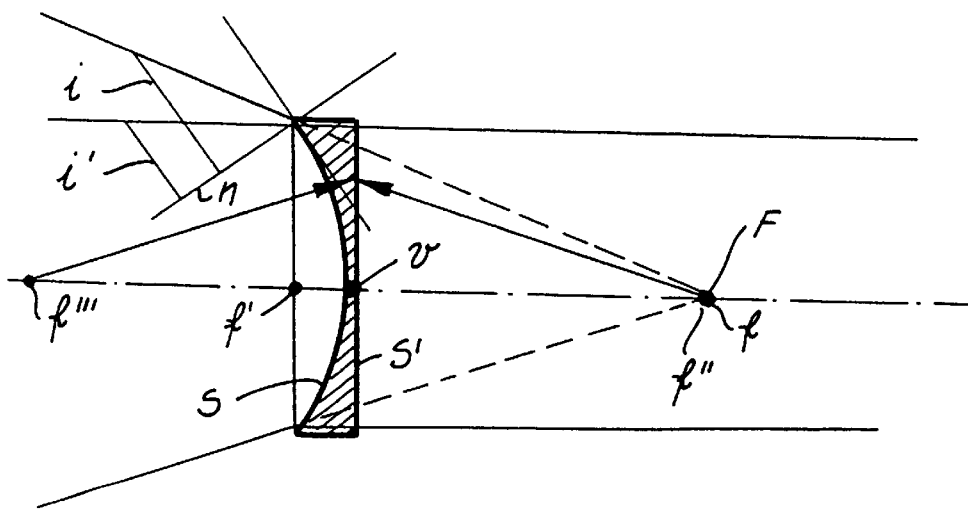

In FIG. 7(b), there is, at the left side of the lens, the basic hyperboloidal surface S, derived from the two hyperboloidal focuses f' and f.

For the right lens surface S', we have used a plane surface obtained by means of the two focuses f' and f'' of a hyperboloidal surface which are of the same value. This surface is located at the basic vertex point v.

For the left lens surface S, the normal n at the point P is produced by means of the two refraction angles i and i', in proper relation of $\frac{2}{3}$; the converging rays of light R with virtual focus point F will be retracted and will pass through the right lens surface S' parallely towards infinite.

This lens is exactly the same as the basic lens of FIG. 7(b).

For this reason, all of the rays of light R, with virtual focus point F, will be refracted and parallely directed towards infinite.

In FIG. 8 two examples for concave lenses are shown, starting from the basic lens of FIG. 4(b).

Figure 8A:
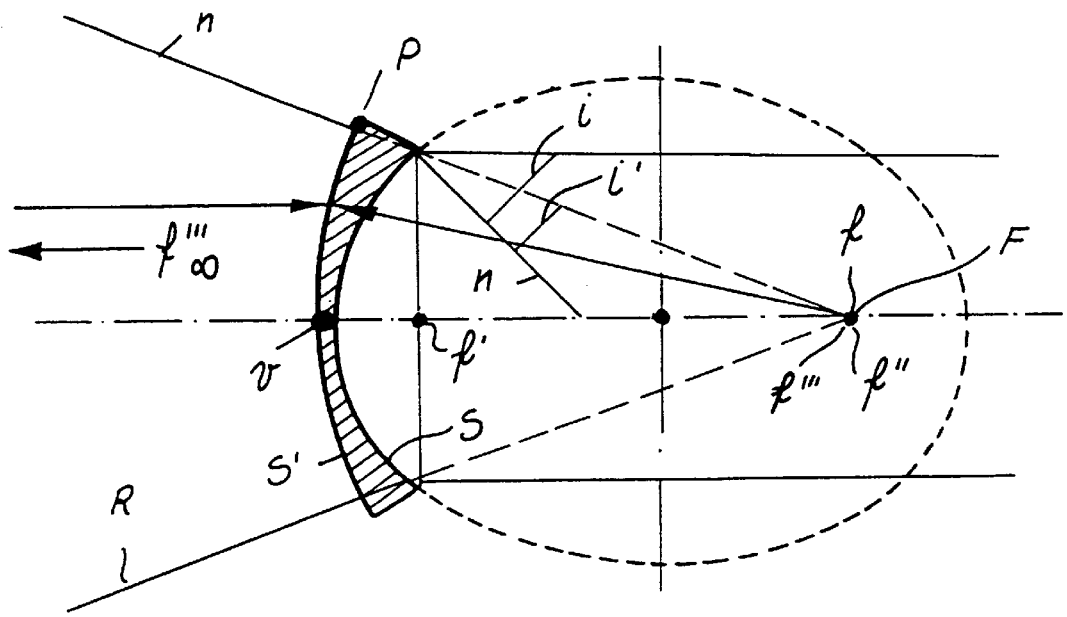
FIG. 8a is a schematic elevation view showing another lens where, at the right side, there is the concave basic ellipsoidal surface and, at the left side, there is applied a spherical surface, whereby the virtual focus of the concave lens is directly obtained exactly at the basic focus point, according to the present invention.

In the first example, in FIG. 8a, at the right side of the concave lens there is the same ellipsoidal concave surface S as in FIG. 4(b).

At the left side of the concave lens, in this example, a spherical surface has been used which is derived from an ellipsoidal surface, with the two focuses thereof f' and f in coincidence, and both in coincidence with the right ellipsoidal basic focus point f.

All of the convergent rays of light R, directed towards the ellipsoidal basic virtual focus point F, will not change their direction because of the spherical surface S', since the normal lines n to the spherical surface are the radii coincident with the focus point f, where the virtual focus point F of that concave lens is also located. Thus, all of the rays of light, by refraction through the basic concave ellipsoidal surface S, will be parallely directed towards infinite. Now, it is clear that the spherical surface S' could also be derived by an hyperboloidal surface, with the right focus f' always in coincidence with the focus f, and the left focus f'' at infinite.

Figure 8B:
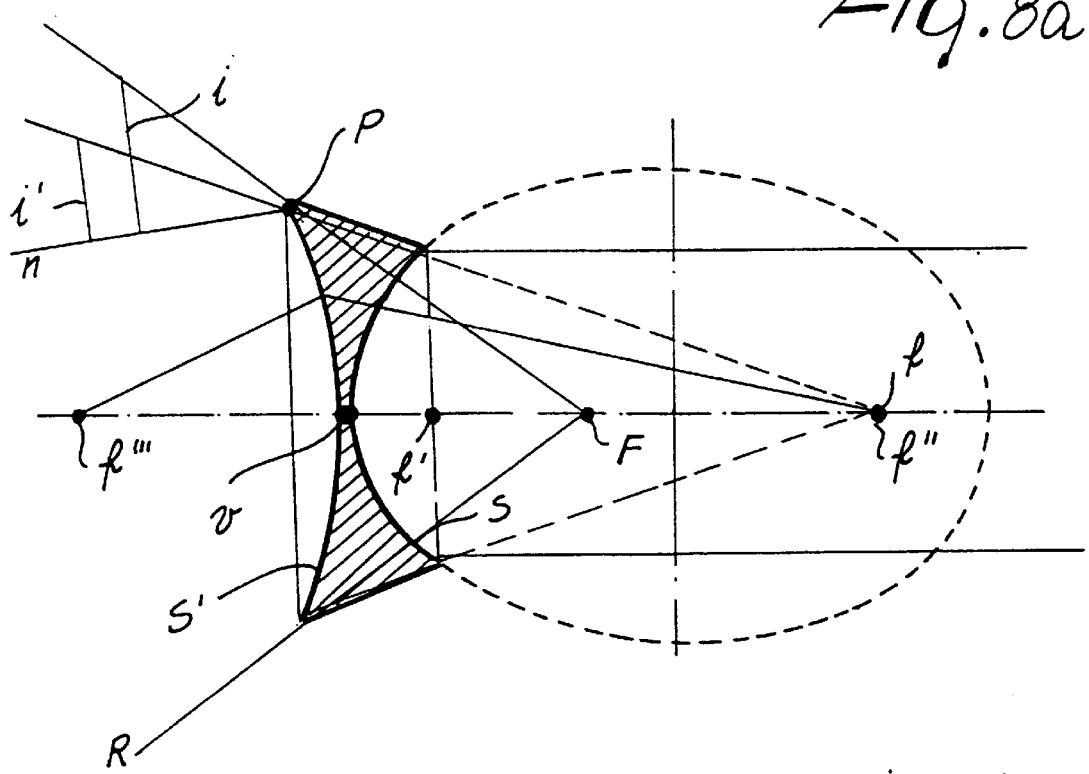
FIG. 8b shows a biconcave lens where, at the right side there is the basic concave ellipsoidal surface and, at the left side there is applied a hyperboloidal surface, with the new focus positioned in optical relation with the virtual focus required for a concave lens of very short focus, according to the present invention.

In FIG. 8(b) we have another example for the construction of the lenses starting from the basic lens of FIG. 4(b).

At the right side we have the concave basic ellipsoidal surface S, obtained by means of the two ellipsoidal focuses f and f'. For the left side, we have traced an hyperboloidal surface S' with the right focus f'' always in coincidence with the basic right focus f and the new focus f at the position which is nearer to the lens.

It is also noted that the radius projections from the two focus points f'', with the normal line n at point P, will provide that the incident and refracted rays of light, respectively at angles i and i', will follow the precise $\frac{2}{3}$ ratio as to the refraction. Here, the lens focus F will be at the shortest focus at $\frac{2}{3}$(f', f).

This lens has the focus point F at the point which is nearer to the lens that will always be at $\frac{2}{3}$(f' f).

After having explained a detailed set of examples of different lenses without spherical aberration, constructed following the optical and geometrical laws set forth in this application, it is convenient to describe also a mathematical formula which is employed to obtain such lenses, that is the formula which shows the new focus location for the variable lens surface, i.e. the variable lens surface in optical relation with the required distance for the lens focus, without spherical aberration.

Before explaining all the mathematical and geometrical relationships in this ellipsoidal and hyperboloidal lens system in order to derive lenses without spherical aberration, it is necessary to clarify the following points.

First of all, for convex lenses, the crossing point O between the vertical and horizontal axis, that is the zero point is the maximum point near the lens to achieve a lens focus without spherical aberration. Moving nearer to the lens than this zero point does not enable to obtain the correction of the spherical aberration phenomenon.

Another key point is that, f or the variable lens side, that is the non basic lens surface for any convex or concave lens, as we said before, one of the focuses of the ellipsoidal or hyperboloidal surface will always be in coincidence with the basic right focus point, and the other focus will always be in optical relationship with the desired lens focus.

Furthermore, for the lens variable side construction, for the convex shape lens, the starting point will be at the vertical plane of the left focus, and for concave lens the starting point will be from the basic vertex point.

Finally, for mathematical formula application, the horizontal inter-focus distance between the basic left focus f' and the right focus f is fundamental for convex lenses, the distance from vertex point v to the right basic focus is a key factor for concave lenses and both for convex and concave lenses it is important the distance between the axis crossing point O and the basic right focus f.

MATHEMATICAL FORMULA APPLICATIONS TO ELLIPSOIDAL AND HYPERBOLOIDAL LENSES WITHOUT SPHERICAL ABERRATION

First of all, referring to FIG. 5, it is convenient to explain some geometrical relationships useful to understand the mathematical formula according to the present invention.

Let us suppose that at the left of the lens there is the ellipsoidal basic surface S, derived from the ellipsoidal basic focuses f' and f. Let us also suppose that at the right side of this surface S there is transparent glass, whereby the light refracted by the first surface S will be focused without any refraction to the right basic focus f.

Let us also suppose that the new variable lens surface S' will be always built with the right focus f in coincidence with the right basic focus f, and also that the new left focus f'' is also in coincidence with the left basic focus f'. Then, it will be understood that the obtained lens will be without any thickness, that is all the rays of light will pass through said lens, without any light refraction.

Finally, let us make the supposition that the new focus f'' used to derive the right lens surface S' is located at 1/10(f' f), within the inter-focus distance, near the left ellipsoidal focus f'.

Since the focus f', is always in coincidence with the right basic focus f, then the ellipsoidal surface obtained would be of a very thin lens of meniscus ellipsoidal shape. The rays of light R that would have been refracted by the left basic surface S and directed to the basic focus f, would be newly refracted and directed towards a very distant lens focus point F, optically correlated with the new location of the variable focus f''. The formula to derive this variable focus is as follows:

$$f''=X/(F/f''),$$

where, f'' is the new variable lens focus to be obtained.

X is, according to FIG. 5, the horizontal basic value which is used.

f' is the other variable focus which is always in coincidence with f; and

F is the required lens focus distance.

In order to simplify the application of the formula, it is convenient in this lens construction system to have the distances correlated with the employed horizontal basic values.

In FIG. 5(a), we have X=f'f and also f''=f'f, whereby F will be located at a distance which is a certain number of times the distance (f'f).

For example, if it is required to obtain a lens the focus F thereof is at a distance which is ten times the distance (f' f), i.e. F=10 (f' f), then the formula to be used will be:

$$f''=X/(F/f'')=(f'f)/[10(f'f)/(f'f)]=(f', f)/10$$

Accordingly, the new ellipsoidal surface can be traced, making, as previously said, a very thin meniscus lens with focus at F=10(f'f), without spherical aberration.

It will also be clear that by locating the new ellipsoidal focus f''' at different points, from f, to f' the new surface S' would provide different meniscus lenses, with the focus each time nearer, from infinite to right basic lens focus point f.

When the new variable focus f''' is exactly located at the right basic lens focus f, then the three focuses f''', f'' and f will be coincident with one another, producing a spherical surface. This is the case of FIG. 5(a), with the lens focus P also at the same point.

The formula which gives the new variable focus, provided that X=(f'f), F=(f'f) and f''=(f'f), is:

$$f''=X/(F/f'')=(f'f)/[(f'f)/(f'f)]=(f', f)$$

Referring to FIG. 5(b), before using the formula to derive the new variable focus f''', it is necessary to provide the following explanations.

By means of the drawings of the lens surfaces S and S', by the refraction angles i and i' at 2/3 within them, we saw different geometrical relationships that are necessary to expose before the proper application of the formula.

In FIG. 5(a), we see that the right new ellipsoidal surface S', that is the spherical surface, could be obtained by the two hyperboloidal radii, the right radius f'' located always in coincidence with the right ellipsoidal basic focus f and the new left hyperboloidal focus f''' at the left infinite.

It is known that any spherical curve is the same as a hyperboloidal curve with one radius in coincidence with the spherical curve radius and the other radius at infinite.

The formula to derive the new variable focus f''' with F=0 is:

$$f''=X/(F/f'')=(f'f)/[0/(f'f)]=\infty$$

FIG. 5(b) is used to obtain a lens of very short focus, and we saw that the shortest focus is obtained at the axis crossing point 0 that is the zero point 0.

As above mentioned by the drawings of these curves, if the lens is nearer to the focus point 0, the derived focus is not a punctual one, thus producing the light refraction, that is the spherical aberration phenomenon.

It will be appreciated that, for this FIG. 5(b), the variable lens surface S' will change from a spherical shape as in FIG. 5(a) to a hyperboloidal shape as in FIG. 5(b), whereby the lens focus will range from zero value as F of FIG. 5(b) to (0 f) value as in FIG. 5(a). This inter-focus distance (0 f) is correlated with the new variable focus f''' the infinite end as in FIG. 5(a) to the nearest location (point O) as in FIG. 5(b).

In the formula application, we must use, for the horizontal basic value X, the new value (0 f) instead of (f' f).

For the other values, that is f'' and F, this will be applied in this figure by the percentage of inter-focus distance (f'f), i.e. in FIG. 5(a) the lens focus will be zero because it is at the end of the inter-focus distance, that is 0(f', f).

For FIG. 5(b), the value of the lens focus F will be (O f)=½(f' f).

Now, for FIG. 5(b), we can apply the formula, with F ½(f' f) and f''=(f'f.), deriving:

$$f''=X/(F/f'')=(0f)/[½(f'f)/(f', f)]=2(0f)$$

This distance 2(O f) will be taken from the zero crossing point O to the left, as shown in the drawing, tracing the new variable hyperboloidal surface S' starting from the left basic focus point f'.

Another example could be a lens with a focus F at ⅓ of (f'f), thus having:

$$f''=(O f)/[⅓(f'f)/(f'f)]=3(0f)$$

By the application of this formula, from the centre 0 to the left, we will have a distance equal to 3(0 f), whereby the basic left point f' will be at the intermediate point between the variable focus f''' and f'' which will have the same value, the obtained surface thus being a plane surface and the ellipsoidal lens with plane surface will have the focus thereof at ⅓ of (f' f), without spherical aberration.

If the desired lens focus is at ¼(f' f), then the location of the variable focus f''' will be at 4(0 f).

When the variable new focus f''' is at infinite, then the formula will be applied for F equal to zero point 0, that is the lens will be exactly the same as in FIG. 5(a).

FIGS. 6a-6b are obtained by means of the basic hyperboloidal surface S, from the basic focus f' and f, also coincident with the hyperboloidal focus f'''.

The inter-focus distance will be the same, that is X(f'f).

Then, referring to FIG. 6(a), having desired to derive a meniscus hyperboloidal convex lens with the focus F thereof located at F=2(f' f), then the application of the formula will be:

$$f''=X/(F/f'')=(f'f)/[2(f'f)/(f'f)]=(f'f)/2$$

as it is shown in the drawing.

Now, if the lens is required to be derived with a plane surface, the two radii f''' and f'' would be of the same value, and the lens thus built would be the same as the from the vertex point v, will provide a minimum lens thickness. Then the curve can be traced.

In the following drawing of FIG. 7(b), we have a plane concave hyperboloidal lens, as the basic concave lens of FIG. 4(a) and the formula will provide the new focus, always with the assumption that F=(f'f), i.e.:

$$f'''=(vf)/(F/f'')=(vf)/[(f'f)/(f'f)]=(vf)$$

by means of which we obtain a plane surface S, as is shown in the drawing, beginning the tracing thereof at the vertex point v.

In the following FIGS. 8(a)-(b), we have applied at the right side, also for concave lenses, the basic ellipsoidal surface S, and at the left side of the lens we will apply the variable lens surface S' of different shapes.

In FIG. 8(a), we have, at the right side, also for concave lenses, the ellipsoidal concave surface S, as FIG. 4(b), which has been obtained from the two ellipsoidal basic focuses f and f'. For the left side of the lens, we have applied here a spherical surface S', or in the same way, a hyperboloidal surface with one focus f'' and the variable focus f''' both in coincidence with the basic focus f.

In this example, the virtual lens focus F will also be in coincidence at the same point.

We can see that the spherical surface S' receives all the focused light rays, directed towards the virtual focus P and coming out through the spherical surface S' without any refraction, because all the rays of light are perpendicular to that spherical surface.

We can see, at point P, that the normal n will be the ray of light R that will pass through the lens thickness without refraction. Then the light will go through and will be refracted by the basic concave ellipsoidal surface, S, the rays will be rightward parallely routed towards infinite, as the basic ellipsoidal lens of FIG. 4(b).

The formula provided that X=(v f), F=(f' f) and f''=(f' f), gives;

$$f'''=(v-f)/(F/f'')=(vf)/[(f'f)/(f'f)]=(vf)$$

It is necessary to point out that, in FIG. 8(a), if the new focus f''', were located between the right ellipsoidal focus f and the left ellipsoidal focus f', then the new ellipsoidal surface would be a curve the shape thereof being comprised between a sphere and an ellipsoidal surface S and it will be appreciated that the derived lens would have the virtual focus thereof at a more distance position towards the right infinite, without spherical aberration.

To the contrary, it is to be recognized that the spherical surface could be also formed by is some hyperbolaidal surface, with the right focus located in coincidence with f'' and with the basic focus f, and the focus f''' at the left infinite.

In FIG. 8(b), we have applied a double concave lens where, at the right side thereof, there is the basic ellipsoidal surface S, and at the left side S' there is a new concave hyperboloidal surface S', with the new focus f''' at a position which is nearest to the lens, that is at ⅔ of the distance (f' f).

In this figure, we use the same value for X, that is X=(v f) and, for the other values, (f' f) for f'' and ⅔ (f' f) for F focus distance.

Accordingly, the formula applied for FIG. 8(b), provided that F=⅔ (f' f) and f''=(f' f), will be:

$$f'''=X/(F/f'')=(vf)/[⅔(f'f)/(f'f)1=3/2(vf)$$

as it is shown in the drawing.

The distance 3/2 (v f) will be taken f ram the basic focus point f leftwards, tracing the new variable hyperboloidal surface S' starting from the vertex point v.

As another example, we show a lens with a focus located at ½(f' f), thus having:

$$f'''=(vf)/[½(f'f)/(f'f)1=2(vf)$$

which will also be taken from the basic focus point f leftwards.

By employing this formula, the new figure would be a plane concave lens because the hyperbolaidal will have two radii which distances will be (v f) from each side of the surface.

By applying this formula, from the vertex point v we get the same distance to derive the curve, i.e. the distance (v f), whereby we get a vertical plane surface, the virtual focus thereof being at a ½ (f' f) distance, without spherical aberration.

If the lens is required to be located at ⅓(f' f), then the f''' focus location will be at 3 times (f' f).

When the new variable focus f''' is at the left infinite, then the formula will be applied for zero point for F (point 0), i.e. said lens is exactly the same as the lens of FIG. 8(a).

The formula provides:

$$f'''=(vf)/[O/(f'f)]∞$$

In order to correct the spherical aberration phenomenon when the light passes from inside a transparent material to the outside, it is necessary that the rays of light be parallel, and this is clearly shown in FIG. 6(b) which shows, that the most convex surface which can be used is a plane surface. For concave hyperboloidal surfaces, it is seen that the maximum allowed angle is ⅔, as shown in FIG. 8(b).

Let us now describe a particular application of the above mentioned lenses without spherical aberration to a stereoscopic camera.

In summary to build lenses without spherical aberration having a second surface which is at a negligible distance from the first surface so that the refraction phenomenon through this second surface can be neglected, it is possible to employ, as the second surface, any of differently curved surfaces.

Figure 9:
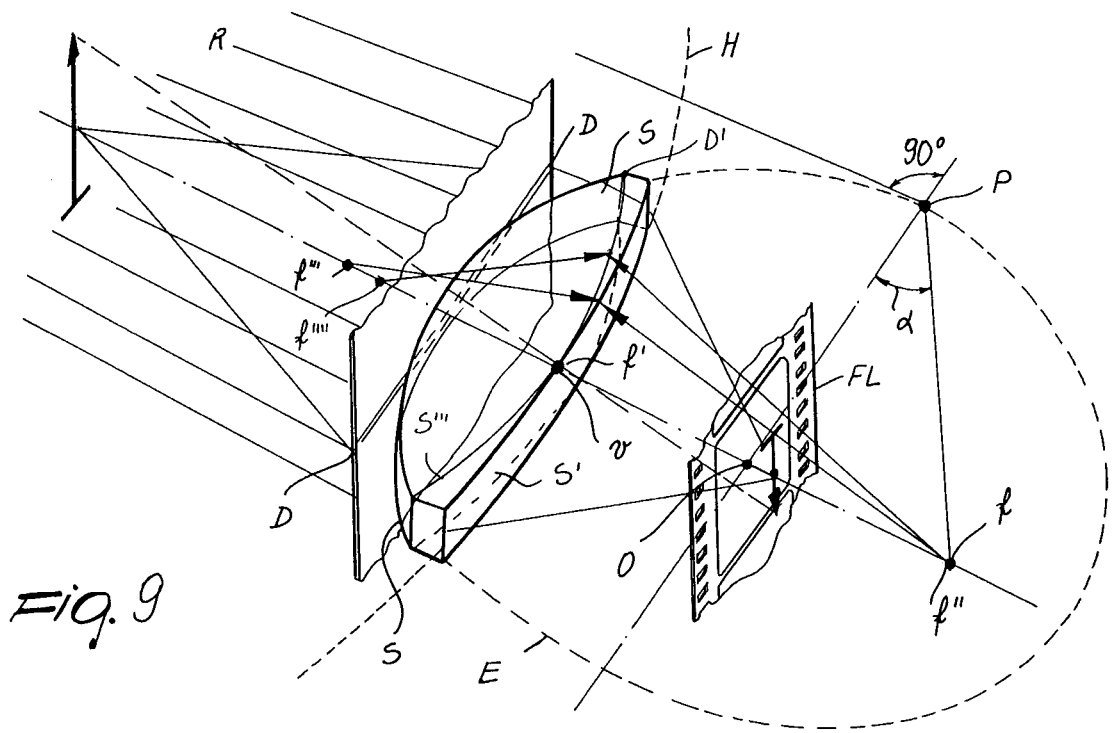
FIG. 9 is a perspective view showing the achievement of an ellipsoidal and hyperboloidal wide optical objective for a stereoscopic camera by means of lenses without spherical aberration, according to the present invention.

Instead, if one desires to obtain a particular lens focus the second surface will be obtained by applying the above exposed formula in order to derive the second focus, f''' of this second surface, this second focus being thus optically correlated to the desired lens focus F. Referring to FIG. 9, it is shown a wide angle optical objective for a stereoscopic camera with stereoscopic information only horizontally and having a punctual focus for the light rays, built by means of lenses without spherical aberration.

The wide angle objective is built by two different surfaces at opposite sides, that is an hyperboloidal and an ellipsoidal surface according to the above mentioned principles.

In particular in FIG. 9 we see the ellipse formed between the two basic focuses f and f' and with vertical and horizontal axis, respectively YY' and XX'.

In this figure we also see the basic ellipsoidal surface S and the second surface S', f of the wide angle objective, with focuses f, f', f'' and f'''.

We see the first basic ellipsoidal surface S and the last surface S', f the whole wide angle objective, with focuses f, f', f" and f'".

By means of this stereoscopic objective, all the light rays R will pass only through a thin diaphragm D and will be focused in a punctual focus upon the vertical lenticular film FL placed at the crossing plane of the ellipsoidal axis, i.e. the point O.

In the lenticular vertical optical film there will only be horizontal stereoscopic information due to the presence of the diaphragm D placed between the rays of light R and the wide angle objective.

It is possible to see in FIG. 9 that the image of the nearest object will be obtained inside the vertical lenticular film FL and the last rays will be focused at the focus plane; thus, the stereoscopic effect of this lenticular film of the stereoscopic camera will be an inverted stereoscopic effect.

It will be recognized that according to the lenticular film location inside the focused ray plane in the camera focus plane, the edges of the photography, i.e. the window (that is the film position, will be the window (stereoscopic frame) of the stereoscopic photographic magnification, upon lenticular photographic paper or stereoscopic grid paper), will also have different stereoscopic appearance according to its position.

For each vertical lenticular elliptical cylinder of the film, all the different image aspects of the pictures taken by means of the camera wide angle objective will form, but only horizontally, from the right end a to the left end z; thus the viewer will be able to see the different stereoscopic information although he laterally displaces his head inside the viewing zone which will be as wide as the wide angle stereoscopic objective.

The vertical lenticular film FL will also be made by means of an elliptical plane surface, having made its thickness as thin as possible, both for the lenticular film of the camera and for the copies, i.e. the photographic magnification upon lenticular stereoscopic paper, or stereoscopic grid paper, with its thickness in stereoscopic proportion with viewers's distance, to obtain perfect stereoscopic information.

In order to achieve chromatic aberration correction, the proper focus locations of the four focuses f, f', f" and f'" must be chosen, by experimental tests, with such ellipsoidal and hyperboloidal lenses.

In order to achieve chromatic aberration correction, a new hyperboloidal surface is shown in FIG. 9, this last surface being obtained by the focus f'" which is derived from the point P' of the surface S'", proportionally as f" and f'".

Referring to FIG. 9, from point P, an ideal ray of light which is incident perpendicularly, i.e. with an angle of 90', to a surface has a maximum refraction angle X. The sine of this angle X provides the location on the horizontal axis of the ellipsoidal focus f, this focus is thus located at a distance from the axis crossing centre O which is equal to (O f). The cosine of the angle X, that is the distance (O P), provides the vertical half-axis of the ellipsoid E, to derive the surface S.

In order to obtain the right hyperboloidal lens surface S', the right hyperboloidal focus f', will always be in coincidence with the right ellipsoidal focus f and the left hyperboloidal focus f'" will be obtained by the application of the above-explained formula f'"=X/(F/f"), where X=(0 f), F=½ (f f), f"=(f f) and accordingly, by the formula we derive f'" which results 2 (0 f), this distance being taken from the axis crossing centre O leftwards.

By means of this lens having a first ellipsoidal surface S (provided by the ellipse E) and a second hyperboloidal surface S' (provided by the hyperbole H), the parallel rays of light R will all be focused at the axis crossing point O, without spherical aberration.

In summary, the wide angle optical objective for stereoscopic vision, according to the present invention, used in a stereoscopic camera, is built by employing lenses without spherical aberration and a horizontally located diaphragm D to produce a stereoscopic effect only horizontally.

Various modifications will become possible for those skilled in the art after receiving the teachings of the present disclosure without departing from the scope thereof. Obviously the employed materials are not limited by standard glass herein employed, which must be considered only as an example. Accordingly the reported refraction index (referred to glass) is neither a limiting factor, and any refraction index is allowed.

I claim:

1. A lens structure without spherical aberration comprising two aspherical surfaces of transparent material, facing one towards the other, said surfaces having ellipsoidal and hyperboloidal form, the ellipsoidal surface is derived by an ellipse inscrited within a circumference, the sine of the limit refraction angle of the transparent material employed constituting the distance on the horizontal axis of an ellipsoidal focus point from the centre of the circumference.

2. The lens structure without spherical aberration according to claim 1, wherein the cosine of said limit refraction angle of the transparent material employed constituting the distance of half vertical ellipsoidal axis of the ellipsoidal surface.

3. The lens structure without spherical aberration according to claim 1, wherein the hyperboloidal surface is obtained by applying the sine of said limit refraction angle of said transparent material, for vertex position on the horizontal axis from a hyperboloidal focus point to vertex of the cone within which the hyperbole is inscrited.

4. The lens structure without spherical aberration according to claim 1 wherein the cosine of said limit refraction angle of the transparent material employed constituting the distance of half vertical ellipsoidal axis of the ellipsoidal surface; and wherein the hyperboloidal surface is obtained by applying the sine of said limit refraction angle of said transparent material for vertex position on the horizontal axis from a hyperboloidal focus point to vertex of the core within which the hyperbole is inscrited wherein said ellipsoidal focus point and hyperboloidal focus point are in coincidence.

5. The lens structure according to claim 4 wherein for convex lens with the first curved surface of ellipsoidal form, the second curved surface has a first one of the second surface focuses, in coincidence with the right focus of said first surface and a second one of said second surface focuses correlated to said desired focus according to the following formula:

$$f'''=X/(F/f'),$$

where, f'" is the second of the second surface focuses;

X is the distance between the first and second focuses of said first surface;

F is the desired lens focus; and f" is the first one of said second surface focuses which is always located in coincidence with said right focus of said first curved surface, the beginning of that second surface will be at left vertical ellipsoidal focus plan.

6. The lens structure according to claim 4 wherein for convex lens with the first curved surface of ellipsoidal form, for a very short focus, the second curved surface has a first one of the second surface focuses in coincidence with the right focus of said first surface and a second one of said second surface focuses correlated to said desired very short focus, according to the following formula:

$$f'''=X/(F/f''),$$

where,
- f''' is the second of the second surface focuses;
- X is the distance between the ellipsoidal croising axis point and the second focuses of said first curved surface;
- F is the desired lens focus; and
- f'' is the first one of said second surface focuses which is always located in coincidence with said right focus of said first curved surface, the vertex of said second curved surface being located in coincidence with the left ellipsoidal focus of said first curved surface.

7. The lens structure according to claim 4 wherein for convex lens with the first curved surface of hyperboloidal form the second curved surface has a first one of the second surface focuses in coincidence with the right focus of said first surface and a second one of said second surface focuses correlated to said desired focus according to the following formula:

$$f'''=X/(F/f''),$$

where,
- f''' is the second of the second surface focuses;
- X is the distance between the first and the second focuses of said first curved surface;
- F is the desired lens focus; and
- f'' is the first one of said second surface focuses which is always located in coincidence with the right focus of said first curved surface, the beginning of that second surface will be at left vertical ellipsoidal focus plan.

8. The lens structure according to claim 7 wherein for a concave lens with the first curved surface of ellipsoidal or hyperboloidal form, said second surface has a first one of the second surface focuses in coincidence with the right focus of said first surface and a second one of said second surface focuses correlated to said desired focus according to the following formula:

$$f'''=X/(F/f''),$$

where,
- f''' is the second of the second surface focuses;
- X is the distance between the vertex and the first focus of the first curved surface;
- F is the desired lens focus; and
- f'' is the first one of said second surface focuses which is always in coincidence with said right focus of said first curved surface, the vertex of said first and second curved surfaces being located in coincidence with each other for minimum lens thickness.

9. A stereoscopic camera including a lens structure without spherical aberration comprising
- two aspherical surfaces of transparent material, facing one towards the other, said surfaces having ellipsoidal and hyperboloidal, the ellipsoidal surface is derived by an ellipse inscrited within a circumference, the sine of the limit refraction angle of the transparent material employed constituting the distance, on the horizontal axis, of said focus point from the centre of the circumference;
- a camera wide angle objective of said lens structure without spherical aberration, one side of said lens being of ellipsoidal convex configuration and the other side being of convex hyperboloidal configuration; and
- a horizontal diaphragm being located in front of said wide angle objective in order to obtain stereoscopic information only horizontally.

10. The stereoscopic camera according to claim 9 wherein said wide angle objective of said stereoscopic camera includes a further hyperboloidal surface to correct the chromatic aberration correction.

* * * * *